Dec. 19, 1939.   H. KOESTER   2,183,937
BELT FASTENER
Filed Jan. 28, 1939
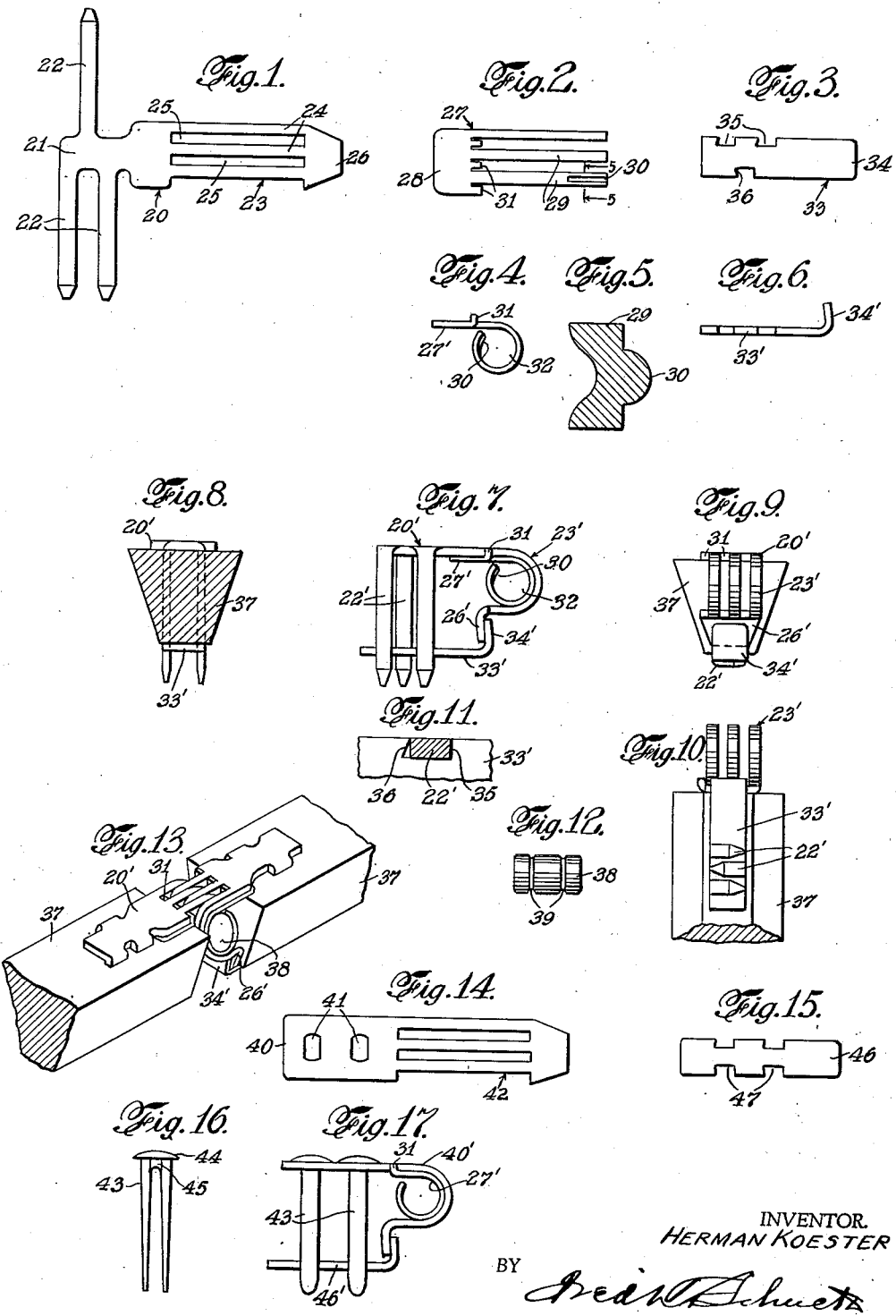
INVENTOR.
HERMAN KOESTER
BY
ATTORNEY.

Patented Dec. 19, 1939

2,183,937

UNITED STATES PATENT OFFICE 2,183,937

BELT FASTENER

Herman Koester, Waterbury, Conn., assignor to The Bristol Company, Waterbury, Conn., a corporation of Connecticut Application January 28, 1939, Serial No. 253,293

12 Claims. (Cl. 24—33)

The invention relates to belt fasteners, and more especially to fasteners for V-belts now widely used in the driving of rotating machinery. The relatively small width of V-belts in proportion to their thickness precludes the use of many of the well-known forms of fasteners and lacings; and the fact that the bevelled sides must be free of obstruction and may be required to withstand considerable compressive forces introduces further problems not found in the uniting of ends of the conventional forms of flat belting.

It is an object of this invention to provide for V-belts a metallic hinged fastener which shall be characterized by a strength consistent with the belt to whose mechanical dimensions it is mechanically adapted.

A further object is found in the provision of a fastener of the above nature in which friction and consequent tendency to wear shall be minimized.

A still further object is found in the provision for this class of fastener of a hinged joint in which parts subjected to sliding action shall be substantially enclosed and not exposed to the admission of abrasive or other foreign matter.

Another object of the invention is found in the provision of a fastener of the above nature, which shall be readily applicable to the belt without the use of special tools, and which shall be durable in service and adapted to manufacture at a reasonable cost.

In carrying out the invention, it is proposed to provide as a means for uniting the ends of a belt, trimmed to the proper length, a metallic fastener having interleaving portions of steel or the like, having strength requisite to the purpose, and readily applicable to the material of the belt to form elements of a hinge joint. The said interleaving portions are coordinated into a flexible unit by means of a suitable pintle or hinge-pin, and the pin is substantially enclosed in a tubular channel having an insert or liner of preferably "anti-friction" metal forming a bearing of relatively low friction characteristics.

The nature of the invention, however, will best be understood when described in connection with the accompanying drawing, in which:

Figs. 1, 2, and 3 are plan views of stamped metal blanks adapted to the formation of the principal elements constituting a belt fastener embodying the principles of the invention.

Fig. 4 is a side elevation of an element formed from the blank shown in Fig. 2.

Fig. 5 shows to an enlarged scale a section of a portion of the element shown in Figs. 2 and 4, as taken on the line 5—5, Fig. 2.

Fig. 6 is a side elevation of an element formed from the blank shown in Fig. 3.

Fig. 7 is a side elevation, showing an element formed from the blank shown in Fig. 1, positioned in its final relationship to the other two of the above-mentioned elements.

Figs. 8 and 9 are oppositely viewed end elevations, with reference to a portion of a V-belt, of an applied fastener element of the type embodying the invention; the element being shown in the former figure as positioned in relation to the belt, and in the latter figure as finally secured in place.

Fig. 10 shows the same assembly as illustrated in Fig. 9, as viewed from the inner side or bottom of the belt.

Fig. 11 shows a detail of the assembly of a fastener element.

Fig. 12 is a side elevation of a pin suitable for the purpose of uniting two opposed and similar fastener elements into a complete joint.

Fig. 13 is a perspective view of a complete joint embodying the principles and features of the invention.

Figs. 14 and 15 are plan views of blanks suited to the formation of elements of an alternative form of fastener embodying the invention.

Fig. 16 is a front elevation of a rivet element suited for use with the same.

Fig. 17 is a side elevation of an assembly embodying the alternative form of the invention.

Referring to the drawing, more particularly Fig. 1 thereof, there is shown a blank 20 which stamped or otherwise formed from sheet steel or the like, and has a body portion 21 from which project in staggered relationship oppositely directed and pointed tongues 22. The blank includes, also, a slotted portion 23 comprising parallel strip parts 24 at right angles to the said tongues and alternating with slots 25, said slotted portion terminating in a tapered portion 26. The blank is formed into an element 20' of a fastener member, as shown in Figs. 7 and 8, by having the tongues bent all in the same direction perpendicular to the plane of the body portion 21, forming tooth portions 22', and by having the slotted portion 23 formed to a part 23' having semi-circular curvature, with the tapered portion 26 bent back to constitute a flat hook part 26'.

In Fig. 2 is shown a blank 27 formed preferably, though not necessarily, of non-ferrous or anti-friction material such as brass, bronze, or other anti-friction alloy, and comprising a body portion 28 having extending therefrom strip parts 29 with lateral spacing corresponding to that of the strip parts 24 in Fig. 1, but of somewhat greater length and separated at their extremities. In one of said strip parts 29 there is formed, by embossing, a ridge 30, shown to an enlarged scale in Fig. 5. Between the strip parts 29 are left projecting short portions 31 of the material of the blank, approximating in length the thickness of the material of blank 20. The blank 27 is shaped to its final form 27' by bending the strip portions 29 downwardly, as shown in Fig. 4, to a substantially circular conformation to enclose a cylindrical space 32 having its axis parallel to the original plane of the blank 27 but displaced therefrom, and of an external diameter substantially the same as the internal diameter of curvature of the part 23' shown in Fig. 7. The embossed ridge 30 is made to lie within said cylindrical space, and the short portions 31 are bent perpendicularly upward.

In Fig. 3 is shown a blank 33 of steel or the like, having an end portion 34 and lateral notches 35 corresponding in position with the tooth portions 22' of the element 20'. The notches 35 may be provided each with one dovetailed or reentrant edge 36, as shown to an enlarged scale in Fig. 11, the purpose of said edge to be hereinafter more fully set forth. The blank 33 is shaped to its final form, shown at 33' in Fig. 6, by having its end portion 34 bent upwardly from the plane of the blank at a slightly acute angle, forming a hook part 34'.

The manner of assembly of the several elements into a single fastener member is shown in Figs. 7, 8, 9, and 10. As set forth, the element 27' is placed with its curved strip portion within the similar portion 23' of the element 20'; and the short portions 31 forced into the ends of the slots in element 20', as shown in Figs. 7 and 13. The element 27' is thus completely housed, and may be considered as integral with the element 20' and forming a liner therefor. The member thus formed by the union of the elements 20' and 27' is placed upon the outer or wide face of the trimmed end of a portion 37 of V-belt material to be formed into a joint, and the teeth 22' forced through the material of the belt until they project beyond the inner or narrow face with the flat portion of the liner 27' and the inner face of the element 20' in intimate contact with the broad face of the belt, and the cylindrical portion of the liner and the part 23' overhanging the end of the same. The element 33' is then applied from the inner side of the belt, the hook portion 34' being sprung into engagement with the hook portion 26' of the member 20'. With the respective parts held in these relative positions, the teeth 22' are then forcibly bent over toward the center of the belt and clinched down on the flat portion of the member 33', thereby providing a rigid metallic hinge element securely attached to the one end of the belt.

A similar assembly of parts is made at the other end of the belt to be united, and the two ends so fitted are brought into juxtaposition, and the strip portions 23' of the two members interleaved, thus forming a substantially enclosed cylindrical space wholly faced with the material of the liner 27'. A pintle or pin member 38, shown in Fig. 12, formed of metal, rawhide, oil-impregnated material or the like, cylindrical in shape, and having two transverse circumferential grooves 39, is provided for joining the two hinge elements of the fastener member into a hinged unit by its insertion into the cylindrical space formed by the interleaving parts. The dimensions of the pin member 38 and the axial spacing of the grooves 39 along the same are made such that when the pin is forced into the space 32 the embossed ridges 30 of the two interleaving parts lying toward the extremities of the pin will enter the respective grooves and be held there by the spring action of the material of the liner. This serves positively to retain the pin from further axial movement and renders it impossible for the same to work out of place under operating conditions. At the same time, the grooves in the pin by maintaining the two cooperating fastener elements in proper axial relationship, prevent metal-to-metal contact of the juxtaposed flat surfaces and thus eliminate wear upon the same.

It will be seen that the extended portions of the liner 27' in the assembled position will alternate with the curved portions 23' of the cooperating fastener element, so that there will remain no openings whereby grit or other objectionable foreign material might enter the cylindrical channel 32. Not only does this construction make for the exclusion of abrasive particles, but at the same time it tends to retain lubricant, whether the same be applied from an external source or derived from a pin member made of prelubricated material. These features, coupled with the possibility of forming the liner of a metal or alloy having a low friction coefficient or other characteristics making it superior to steel for bearing purposes, render the hinge joint practically immune to wear and greatly increase its serviceable life.

As will be seen from Figs. 7 and 13, the engagement of the hook members 26' and 34' is such as to oppose any tendency of the curved portion 23' of the member 20' to straighten under the stress of operation; and since it is practicable from a manufacturing point of view to harden the part 33' and the curved part 23' of the member 20', without hardening the teeth 22' to an extent to interfere with clinching, the strength of these parts can readily be made consistent with such stresses as may be applied to the fastener.

Referring to Fig. 11, it will be seen that the tooth parts 22' may enter freely the notches 35, even though they should spread slightly in being forced through the belt material and require to be driven laterally into place before clinching. Any tendency of the part 33' to be pulled toward the end of the belt due to operating stresses will cause the edge of the tooth part 22' to engage the reentrant dovetailed edge 36 of the notch 35, setting up a reaction which tends to cause the teeth to clasp the part 33' and positively prevent any possibility of the latter being pulled out of place.

The alternative form of belt fastener embodying the principles of the invention, and shown in Figs. 14 to 17, inclusive, is identical with that hereinbefore described, with the exception of the feature that the tooth portions formed from the original blank in the embodiment hereinbefore set forth are in the present form replaced by bifurcated rivets having chordal sections, similar to the rivets shown in U. S. Letters Patent No. 1,968,893, granted to the applicant August 7, 1934.

In the said alternative form there is provided a blank 40 of steel or the like, as shown in Fig. 14, having therethrough perforations 41, each in the form of a circle lacking two parallel and similar chordal portions, said blank having an extended slotted portion 42 in all respects identical with the portion 23 of the blank 20 shown in Fig. 1, and adapted to be formed into an element 40' as shown in Fig. 17. In Fig. 16 is shown a bifurcated rivet 43 having a domed cap portion 44 and a shank portion of a section in the form of a circle having parallel opposed chordal or flat portions 45, such that the portion immediately adjacent the cap will be substantially a fit for any one of the perforations 41 in the blank 40. The shank part of the rivet is given a form preferably slightly tapered both on the outside and inside surfaces of the bifurcations, facilitating the forcing of the rivet through the material of the belt, the internal and external slopes of the taper being so proportioned as to cause the bifurcations of the rivet to pass through the material in substantially straight lines.

Fig. 15 shows a blank 46 identical with the blank 33, shown in Fig. 3, in all respects except that the staggered notches 35 in the latter are replaced by opposed notches 47 in the blank 46, similar in form to those in the blank 33, and are adapted to receive the two portions of the shank of the bifurcated rivet 43 when the same is in its final position. The blank 46 is formed into an element 46' as shown in Fig. 17, in a manner identical with the forming of the element 33' from the blank 33 as shown in Fig. 6. The elements 40' and 46', together with an element 27', are assembled in a manner similar to the assembly shown in Fig. 7, except that the tooth portions 22' are replaced by one or more of the bifurcated rivets 43, these being forced through the material of the belt, positioned in the notches 47 in the element 46', and afterwards clinched on the inner side of the same, thus serving to coordinate the several parts into an operative unit of a fastener of the hinged type as shown in Fig. 17. The coordination of the two fastener elements into a complete hinge joint by means of a connecting pin or pintle, is identical with that set forth in connection with the embodiment shown in Fig. 13; and the operating features and advantages would be substantially the same as those enumerated as characterizing that form of the invention.

I claim:

1. A hinged metallic jointure for non-metallic belting, comprising two similar members, each having an element adapted to be secured to a flat face of the belting to be joined and including a slotted portion of cylindrical curvature adapted to overhang the end of said belting and terminating in a hook portion, and a further element adapted to be secured to the opposite flat face of said belting and including a hook portion to engage said first-named hook portion, together with securing means adapted to pass completely through the material of said belting and securing both said elements to the belting, the said two members being adapted to have their slotted portions interleaved, forming a cylindrical channel, and a pin member adapted to be positioned in said channel to incorporate said members into a hinged structure.

2. A hinged metallic jointure for non-metallic belting, comprising two similar members, each having an element adapted to be secured to a flat face of the belting to be joined and including a slotted portion of cylindrical curvature adapted to overhang the end of said belting and terminating in a hook portion, a liner for said element, and a further element adapted to be secured to the opposite flat face of said belting and including a hook portion to engage said first-named hook portion, together with securing means adapted to pass completely through the material of said belting and securing both said elements to the belting, the said two members being adapted to have their slotted portions interleaved, forming a cylindrical channel, and a pin member adapted to be positioned in said channel with a lining to incorporate said members into a hinged structure.

3. A hinged metallic jointure for non-metallic belting, comprising two similar members, each having an element adapted to be secured to a flat face of the belting to be joined and including a slotted portion of cylindrical curvature adapted to overhang the end of said belting and terminating in a hook portion, an anti-friction liner for said element, and a further element adapted to be secured to the opposite flat face of said belting and including a hook portion to engage said first-named hook portion, together with securing means adapted to pass completely through the material of said belting and securing both said elements to the belting, the said two members being adapted to have their slotted portions interleaved, forming a cylindrical channel, and a pin member adapted to be positioned in said channel with an anti-friction lining to incorporate said members into a hinged structure.

4. A hinged metallic jointure for non-metallic belting, comprising two similar members, each having an element adapted to be secured to a flat face of the belting to be joined and including a slotted portion of cylindrical curvature adapted to overhang the end of said belting and terminating in a hook portion, a liner for said element, and a further element adapted to be secured to the opposite flat face of said belting and including a hook portion to engage said first-named hook portion, together with securing means adapted to pass completely through the material of said belting and securing both said elements to the belting, the said two members being adapted to have their slotted portions interleaved, forming a substantially closed cylindrical channel, and a pin member adapted to be positioned in said channel with a lining to incorporate said members into a hinged structure.

5. A hinged metallic jointure for non-metallic belting, comprising two similar members, each having an element adapted to be secured to a flat face of the belting to be joined and including a slotted portion of cylindrical curvature adapted to overhang the end of said belting and having a liner with a ridge inwardly formed on the same, the said two members being adapted to have their slotted portions interleaved forming a cylindrical channel with a lining, and a pin member adapted to be positioned in said channel to incorporate said members into a hinged structure, said pin having a transverse groove adapted to be engaged by said ridge.

6. A hinged metallic jointure for non-metallic belting, comprising two similar members, each having an element adapted to be secured to a flat face of the belting to be joined and including a slotted portion of cylindrical curvature adapted to overhang the end of said belting and having a liner with a ridge inwardly formed on the same, the said two members being adapted to have their slotted portions interleaved forming a cylindrical channel with a lining, and a pin member adapted to be positioned in said channel to incorporate said members into a hinged structure, said pin having axially displaced grooves adapted to be engaged by the ridges on the liners of the respective members.

7. A hinged metallic jointure for non-metallic belting, comprising two similar members, each having an element adapted to be secured to a flat face of the belting to be jointed and including a slotted portion of cylindrical curvature adapted to overhang the end of said belting and terminating in a hook portion, and a further element adapted to be secured to the opposite flat face of said belting and including a hook portion to engage said first-named hook portion, together with securing means adapted to pass completely through the material of the belting and securing both said elements to the belting, said further element having lateral notches adapted to receive said securing means, the said two members being adapted to have their slotted portions interleaved forming a cylindrical channel, and a pin member adapted to be positioned in said channel to incorporate said members into a hinged structure.

8. A hinged metallic jointure for non-metallic belting, comprising two similar members, each having an element adapted to be secured to a flat face of the belting to be joined and including a slotted portion of cylindrical curvature adapted to overhang the end of said belting and terminating in a hook portion, and a further element adapted to be secured to the opposite flat face of said belting and including a hook portion to engage said first-named hook portion, together with securing means adapted to pass completely through the material of the belting and securing both said elements to the belting, said further element having lateral notches with dovetail portions and adapted to receive said securing means whereby under normal operating stresses the latter will tend to embrace said further element, the said two members being adapted to have their slotted portions interleaved forming a cylindrical channel, and a pin member adapted to be positioned in said channel to incorporate said members into a hinged structure.

9. A hinged metallic jointure for non-metallic belting, comprising two similar members, each having an element adapted to be secured to a flat face of the belting to be joined and including a slotted portion of cylindrical curvature adapted to overhang the end of said belting and terminating in a hook portion, and a further element adapted to be secured to the opposite flat face of said belting and including a hook portion to engage said first-named hook portion, together with securing means forming a part of said first-named element and adapted to pass completely through the material of said belting and securing both said elements to the belting, the said two members being adapted to have their slotted portions interleaved, forming a cylindrical channel, and a pin member adapted to be positioned in said channel to incorporate said members into a hinged structure.

10. A hinged metallic jointure for non-metallic belting, comprising two similar members, each having an element adapted to be secured to a flat face of the belting to be joined and including a slotted portion of cylindrical curvature adapted to overhang the end of said belting and having a metallic liner element similarly slotted and provided with portions projecting from said slots and adapted to enter the slots in the first-named element to coordinate said two elements into an integral unit, the said two members being adapted to have their slotted portions interleaved forming a lined cylindrical channel, and a pin member adapted to be positioned in said channel to incorporate said members into a hinged structure.

11. A hinged metallic jointure for non-metallic belting, comprising two similar members, each having an element adapted to be secured to a flat face of the belting to be joined and including a slotted portion of cylindrical curvature adapted to overhang the end of said belting and having a metallic liner element with a ridge inwardly formed on the same, said liner being slotted and provided with portions projecting from said slots and adapted to enter the slots in the first-named element to coordinate said two elements into an integral unit, the said two members being adapted to have their slotted portions interleaved forming a lined cylindrical channel, and a pin member adapted to be positioned in said channel to incorporate said members into a hinged structure and having axially displaced transverse grooves adapted to be engaged by the ridges on the liner elements of the respective members.

12. A hinged metallic jointure for non-metallic belting, comprising two similar members, each having an element adapted to be secured to a flat face of the belting to be joined and including a slotted portion of cylindrical curvature adapted to overhang the end of said belting and terminating in a hook portion, said element having a metallic liner element with a ridge inwardly formed on the same, said liner being slotted and provided with portions projecting from said slots and adapted to enter the slots in the first-named element to coordinate said two elements into an integral unit, and a further element adapted to be secured to the opposite flat face of said belting and including a hook portion to engage said first-named hook portion, together with securing means adapted to pass completely through the material of the belting and securing all of said elements to the belting, said further element having lateral notches adapted to receive said securing means, the said two members being adapted to have their slotted portions interleaved forming a lined cylindrical channel, and a pin member adapted to be positioned in said channel to incorporate said members into a hinged structure and having axially displaced transverse grooves adapted to be engaged by the ridges on the liner elements of the respective members.

HERMAN KOESTER.